United States Patent [19]
Morita

[11] Patent Number: 5,168,767
[45] Date of Patent: Dec. 8, 1992

[54] COMPACT BALL SCREW ASSEMBLY

[75] Inventor: Kunihiko Morita, Koganei, Japan

[73] Assignee: Nippon Thompson Co., Ltd., Japan

[21] Appl. No.: 706,616

[22] Filed: May 29, 1991

[30] Foreign Application Priority Data

Jun. 4, 1990 [JP] Japan .................. 2-58418[U]

[51] Int. Cl.⁵ .......................................... F16H 25/22
[52] U.S. Cl. ..................... 74/424.8 NA; 74/424.8 R;
74/459; 184/99; 384/8; 384/99
[58] Field of Search .............. 74/424.8 R, 424.8 NA,
74/459, 89.15; 184/99; 384/8, 99, 96

[56] References Cited

U.S. PATENT DOCUMENTS 2,976,736  3/1961  Cook ................................. 384/99 X
3,029,792  4/1962  Rasmussen ................. 74/424.8 R X
4,741,221  5/1988  Hudimal, Jr. ............... 74/424.8 NA

FOREIGN PATENT DOCUMENTS 926406  7/1982  U.S.S.R. .................... 74/424.8 R
981747  12/1982  U.S.S.R. ........................... 184/99

Primary Examiner—Allan D. Herrmann
Attorney, Agent, or Firm—Skjerven, Morrill, MacPherson, Franklin & Friel

[57] ABSTRACT

A ball screw assembly includes a screw shaft hving a peripheral surface formed with a spiral groove, an outer sleeve fitted onto the screw shaft with a predetermined gap therebetween and a plurality of balls interposed between the screw shaft and the outer sleeve. A ball holder is provided in a radial hole formed in the outer sleeve and a ball is rotatably held in position and in engagement with the spiral groove by the ball holder. A fluid line is formed in the outer sleeve and the ball holder so that a pressuerized fluid may be supplied to establish a fluidic cushion between the ball holder and the ball. Also provided is a plurality of solid lubricants which are preferably arranged alternately with the balls and normally pressed against the spiral groove to keep the groove lubricated at all times.

11 Claims, 2 Drawing Sheets

COMPACT BALL SCREW ASSEMBLY

BACKGROUND OF THE INVENTION

1. Field of the Invention

This invention generally relates to a ball screw assembly, and, in particular, to improvements in a ball screw assembly.

2. Description of the Prior Art

A ball screw assembly is well known in the art. A typical prior art ball screw assembly includes a screw shaft formed with a spiral groove along its peripheral surface, an outer sleeve fitted onto the screw shaft with a predetermined gap therebetween and a plurality of balls interposed between the screw shaft and the outer sleeve to provide a rolling contact therebetween. The outer sleeve is typically provided with at least one endless circulating path along which the balls circulate endlessly so that the screw shaft may move relative to the outer sleeve in the longitudinal direction. Such a typical ball screw assembly is useful in many applications; however, it tends to be bulky since an endless circulating path must be formed in the outer sleeve, and, moreover, it tends to be expensive due to difficulty in manufacture. Furthermore, since the balls are physically in rolling contact with both of the screw shaft and the outer sleeve, the resistance between the screw shaft and the outer sleeve is relatively large, which tends to hinder a fine relative positional control between the screw shaft and the outer sleeve.

In a typical prior art ball screw assembly, the distance between the outer surface of the screw shaft and the outer surface of the outer sleeve is required to be set approximately at twice the diameter of the balls used, and, thus, if such a ball screw assembly were to be fabricated compact in size, difficulty would be encountered in manufacture since enough space could not be found easily in designing an endless circulating path. Because of recent expansion of applications of robot machines in various fields, there has been a need to develop a ball screw assembly compact in size and high in performance.

SUMMARY OF THE INVENTION

In accordance with the present invention, there is provided a ball screw assembly including a screw shaft formed with a spiral groove extending along a peripheral surface thereof, an outer groove fitted onto the screw shaft with a predetermined gap therebetween, and a plurality of balls interposed between the screw shaft and the outer sleeve in engagement with the spiral groove. The outer sleeve is provided with holding means for holding each of the balls in position so that when a relative rotation is imparted between the screw shaft and the outer sleeve, there is produced a relative longitudinal movement between the screw shaft and the outer sleeve. For example, when the screw shaft is driven to rotate relative to the outer sleeve, the screw shaft moves along its longitudinal axis relative to the outer sleeve.

Also provided is a pressurized fluid supplying means for supplying a pressurized fluid to the holding means such that a film of pressurized fluid is formed at least partly between each of the balls and the holding means during operation. In a preferred embodiment, the holding means includes a concave recess for receiving a ball at least partly, and the pressurized fluid supplying means includes a channel leading to a surface of the concave recess. Preferably, air is used as the pressurized fluid. Such a structure is advantageous since a substantial floating condition is established at least between the balls and the outer sleeve during operation so that the resistance between the screw shaft and the outer sleeve can be significantly reduced. In addition, since no endless circulating path is provided for the balls, the outer sleeve can be made extremely thinner, which contributes to make the entire structure compact in size.

In addition, in accordance with a preferred embodiment of the present invention, at least one solid lubricant is provided in the outer sleeve such that it is normally urged into engagement with the spiral groove. Since the balls are always in rolling contact with the spiral groove of the screw shaft, it is important to keep the spiral groove well lubricated at all times. Although such lubrication can be effected with the use of any ordinary lubricant, in accordance with a preferred embodiment of the present invention, at least one solid lubricant is provided to be normally urged against the spiral groove of the screw shaft. Typically, a holding recess is formed in the outer sleeve and a solid lubricant is slidably fitted into such a recess with an urging means, such as a spring, interposed between the bottom of the holding recess and the solid lubricant, which is partly fitted into the spiral groove of the screw shaft. With this structure, the spial groove can be maintained well lubricated at all times. Preferably, a plurality of such solid lubricants are provided.

Therefore, it is a primary object of the present invention to provide an improved ball screw assembly.

Another object of the present invention is to provide an improved ball screw assembly compact in size, simple in structure and high in performance.

A further object of the present invention is to provide an improved ball screw assembly extremely low in resistance and high in accuracy.

A still further object of the present invention is to provide an improved ball screw assembly capable of maintaining a well lubricated condition at all times.

Other objects, advantages and novel features of the present invention will become apparent from the following detailed description of the invention when considered in conjunction with the accompanying drawings.

DESCRIPTION OF THE PREFERRED EMBODIMENTS

Figure 1:
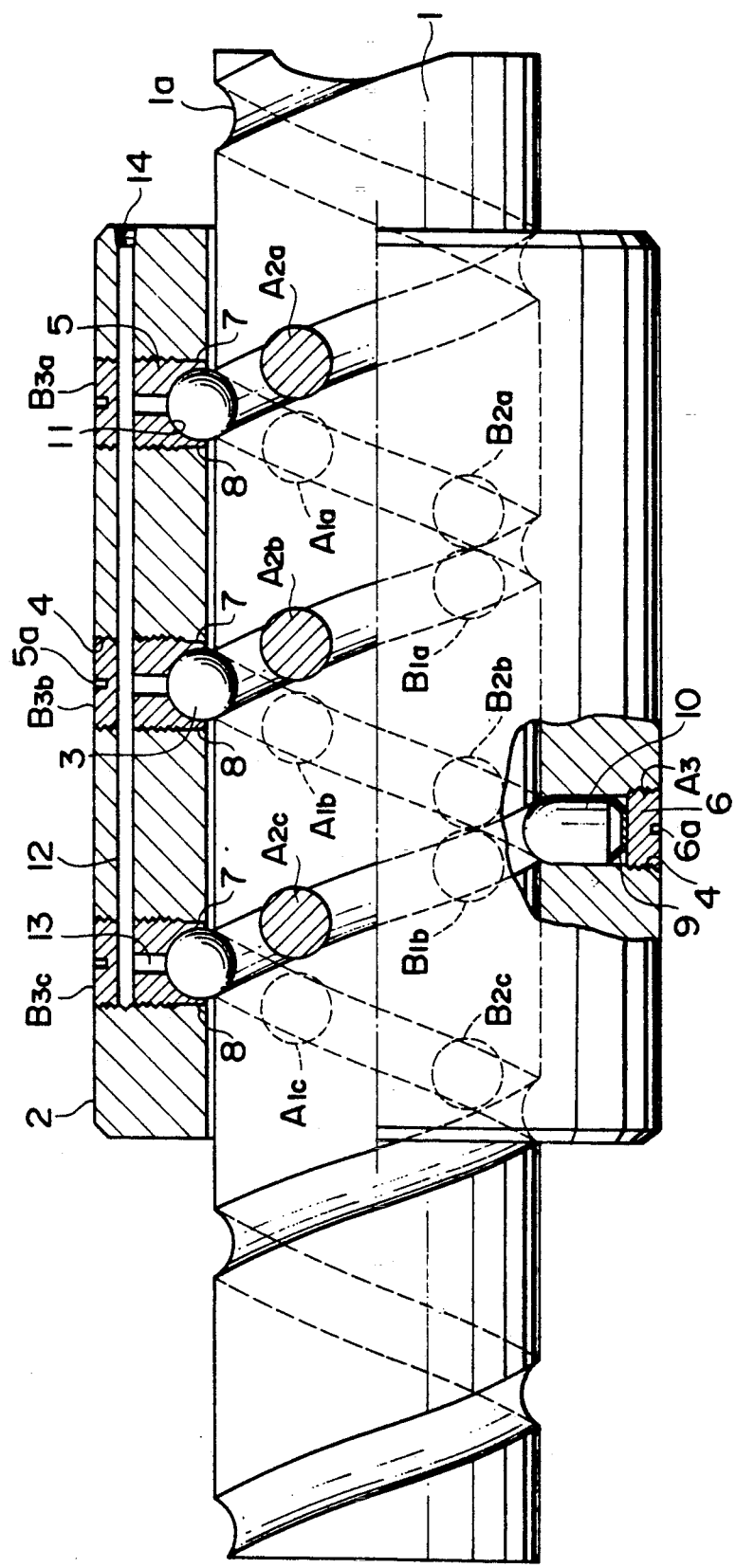
FIG. 1 is a schematic illustration showing partly in longitudinal cross section a ball screw assembly constructed in accordance with one embodiment of the present invention.

Referring first to FIG. 1, there is schematically shown a ball screw assembly constructed in accordance with one embodiment of the present invention. As shown, the present ball screw assembly includes a screw shaft 1 which extends longitudinally and which is formed with a spiral groove 1a along its peripheral surface. In the illustrated embodiment, the spiral groove 1a has a substantially circular cross section. Also provided in the present ball screw assembly is an outer sleeve 2 which is fitted onto the screw shaft 1 with a predetermined gap therebetween. And, a plurality of balls 3 are interposed between the screw shaft 1 and the outer sleeve 2. As shown, the balls 3 are held by the outer sleeve 2 in position and engaged in the spiral groove 1a of the screw shaft 1.

Figure 2:
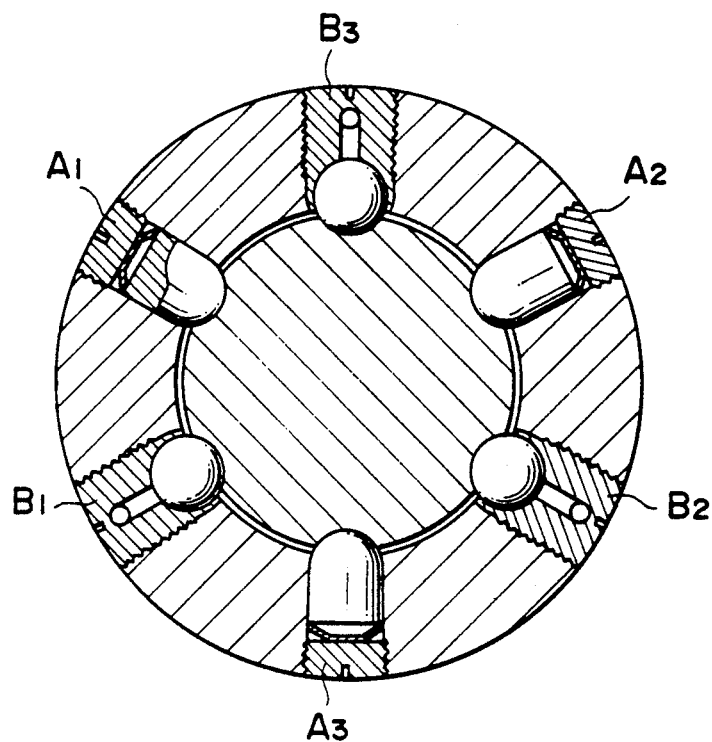
FIG. 2 is a schematic illustration showing a transverse cross section of the ball screw assembly shown in FIG. 1.

In the illustrated embodiment, the balls 3 are equally spaced apart from each other at locations $B_{1a}$, $B_{1b}$, $B_{2a}$, $B_{2b}$, $B_{2c}$, etc. in the longitudinal direction as well as in the circumferential direction. Also provided in the assembly shown in FIG. 1 are solid lubricants 10 at locations $A_{1a}$, $A_{1b}$, $A_{1c}$, $A_{2a}$, $A_{2b}$, $A_{2c}$, etc. spaced apart from each other at equal intervals both in the longitudinal and circumferential directions and in sliding contact with the spiral groove 1a. Thus, as shown in FIG. 2, in one pitch of the spiral groove 1a of the screw shaft, three balls 3 and three solid lubricants 10 are alternately in engagement with the spiral groove 1a. Since the balls 3 are rotatably held by the outer sleeve 2 in position, the balls 3 are in rolling contact with the spiral groove 1a. On the other hand, the solid lubricants 10 are in sliding contact with the spiral groove 1a to keep the spiral groove 1a lubricated.

Figure 3:
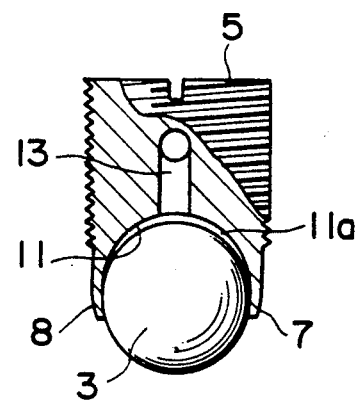
FIG. 3 is a schematic illustration showing on an enlarged scale a ball holder provided in the outer sleeve of the ball screw assembly shown in FIG. 1.

The outer sleeve 2 is formed with a plurality of radial holes 4 arranged along a hypothetical spiral line corresponding to the spiral groove 1a of the screw shaft 1. In the illustrated embodiment, the holes 4 extend through the wall of the outer sleeve 2 in the radial direction and they are threaded at least partly. A plurality of ball holders 5 are threaded into alternate ones (B) of the plurality of holes 4. Each of the ball holders 5 has a concave end 11, which is preferably substantially spherical in shape, at its bottom, and, thus, a corresponding ball 3 may be rotatably received in the concave end 11 at least partly. As best shown in FIG. 3, the concave end 11 has a tip end portion 7, 8 which is curved somewhat inwardly so as to embrace the corresponding ball 3 in the space defined by the concave end 3. It is so set that the distance between the tip end portion 7, 8 is slightly shorter than the diameter of the ball 3. As a result, the ball 3 may be forced into the space defined by the concave end 11 passing through the mouth defined by the tip end portion 7, 8, and once placed in the space defined by the concave 11, the ball 3 may be held in that space by the tip end portion 7, 8. Thus, the ball 3 would not fall off even if the ball holder 5 is oriented as shown in FIG. 3.

The ball holder 5 has an outer or top end which is formed with a slot 5a which may be used to have the ball holder screwed into the corresponding hole 4 using a screw driver or any other tool. In the illustrated embodiment, the ball holders 5 are screwed into the holes 4 until their outer ends are substantially flush with the outer peripheral surface of the outer sleeve 2. However, if desired, the location of each of the ball holders 5 may be so set such that a desired rolling contact may be obtained between the balls 3 and the spiral groove 1a of the screw shaft 1.

As best shown in FIG. 3, the concave end 11 of ball holder 5 is so shaped that a predetermined gap 11a is defined between the surface of the concave end 11 and the ball 3 held in the space defined by the concave end 11. In the structure shown in FIG. 3, the ball 3 is supported by the tip end portion 7, 8 of the concave end 11. In one embodiment, after placing the ball 3 in the space defined by the concave end 11, the tip end portion 7, 8 can be caulked until the diameter of the tip end portion 7, 8 becomes smaller than the diameter of the ball 3. It should be noted that the ball holding structure should not be limited to the above-described structure, and any appropriate means may be applied as long as the ball 3 may be held in position and placed in rolling contact with the spiral groove 1a of the screw shaft 1.

In the remaining holes 4 other than the alternate ones in which the ball holders 5 are located, solid lubricants 10 are located. With this arrangement, the spiral groove 1a can be maintained lubricated uniformly along its entire surface. However, the present invention should not be limited only to such an arrangement, and any other arrangement may also be used, if desired. In the preferred embodiment, the solid lubricant 10 is comprised of $MoS_2$; however, use may also be made of any other solid lubricant materials. As best illustrated in FIG. 2, each of the solid lubricants 10 is slidably fitted into a corresponding hole 4 with its tip end portion sticking out and thus placed in sliding contact with the spiral groove 1a. A stopper screw 6 is threaded into a threaded portion of the hole 4 and a spring 9 is placed between the stopper screw 6 and the outer end of the solid lubricant 10. Thus, the solid lubricant 10 is normally urged radially inwardly so that the inner end of the solid lubricant 10 is normally pressed against the spiral groove 1a. Such a structure is advantageous from an operational point of view since the solid lubricant 10 may be maintained pressed against the spiral groove even if wear occurs and thus the spiral groove 1a may be maintained properly lubricated at all times. The stopper screw 6 has an outer end which is formed with a slot which may be used for screwing the stopper screw 6 into the corresponding hole using a screw drive or the like. In this manner, the location of the stopper screw 6 in the hole 4 may be suitably adjusted to obtain a desired sliding contact between the solid lubricant 10 and the spiral groove 1a. In the embodiment shown in FIG. 2, the solid lubricant 10 has an inner end which is generally U-shaped in cross section. However, the tip end shape of the solid lubricant may be varied suitably depending on the cross sectional shape of the spiral groove 1a. Besides, even if there is a discrepancy in shape between the spiral groove 1a and the inner end of the solid lubricant 10, the tip end of solid lubricant 10 will be suitably changed in shape to fit the cross sectional shape of the spiral groove 1a.

Also provided in the outer sleeve 2 of the present ball screw assembly is a pressurized fluid supply channel 12 which extends in a direction parallel with the longitudinal direction of the screw shaft 1. Such a pressurized fluid supply channel 12 is provided at three locations in the illustrated outer sleeve 2. Each of the pressurized fluid supply channel 12 has one end blocked and another end 14 opened at the left end surface of the outer sleeve 2. The open end 14 may be connected to any pressurized fluid supply system which may include an air compressor. The pressurized fluid supply channel 12 extends through a predetermined number of holes 4. The ball holder 5 is formed with a connection channel 13 which establishes a fluidic connection between the pressurized fluid supply channel 12 and the space defined by the concave end 11. Thus, during operation, pressurized fluid, preferably air, is supplied into the pressurized fluid supply channel 12 through the open end 14 and then into the space defined by the concave end 11 through the connection channel 13 of the ball holder 5. As a result, since pressurized fluid is supplied into the gap 11a between the surface of the concave end 11 and the ball 3, a fluiddynamic cushion is established between the concave end 11 and the ball 3. On the other hand, since the ball 3 tends to be pushed toward the spiral groove 1a to establish a rolling contact, the resistance between the outer sleeve and the screw shaft 1 is significantly reduced. In addition, if the tip end portion 7, 8 is so shaped that some of the pressurized fluid thus supplied leak through a small gap between the ball 3 and the tip end portion 7, 8, then such a leaking fluid will be supplied to the spiral groove 1a to thereby tend to place the ball 3 in a somewhat floating state. In this case, the resistance between the ball 3 and the spiral groove 1a is also reduced. In addition, such a pressurized fluid would help to carry the lubricant scraped from the solid lubricant 10, whereby the spiral groove 1a may be lubricated more uniformly. If desired, any pressure regulating means may be provided in such a pressurized fluid supply system so as to supply pressurized fluid at a regulated pressure.

While the above provides a full and complete disclosure of the preferred embodiments of the present invention, various modifications, alternate constructions and equivalents may be employed without departing from the true spirit and scope of the invention. Therefore, the above description and illustration should not be constructed as limiting the scope of the invention, which is defined by the appended claims.

What is claimed is:

1. A ball screw assembly comprising:
   a screw shaft having a peripheral surface formed with a spiral groove having a predetermined pitch;
   an outer sleeve fitted onto said screw shaft with a predetermined gap therebetween said outer sleeve being formed with a first plurality of radial holes;
   holding means provided in said outer sleeve for holding a plurality of balls in position and in engagement with said spiral groove said holding means including a first plurality of ball holders capable of threadably fitting into a corresponding one of said first plurality of radial holes, each of said first plurality of ball holders having an inner end which is substantially concave in shape to receive therein a corresponding ball partly; and
   pressurized fluid supplying means provided in said outer sleeve for supplying pressurized fluid to each of said plurality of balls such that a fluidic cushion is formed between said holding means and each of said plurality of balls at least partly.

2. The assembly of claim 1, wherein said concave inner end has a tip end portion which has a diameter smaller then a diameter of the ball so that the ball is prevented from slipping away.

3. The assembly of claim 2, wherein said tip end portion is caulked after placing the ball in a space defined by said concave inner end.

4. The assembly of claim 2, wherein a space defined by said concave inner end is larger than the ball so that the ball may move inside the space, so that a predetermined gap may be defined between the concave inner end and the ball.

5. The assembly of claim 1, wherein each of said first plurality of ball holders has an outer end formed with a slot.

6. The assembly of claim 4, further comprising pressurized fluid supplying means for supplying pressurized fluid into said predetermined gap between the concave inner end and the ball to thereby define a dynamic fluid cushion in said gap.

7. The assembly of claim 6, wherein said pressurized fluid supplying means includes at least one first channel extending in said outer sleeve and at least one second channel extending in each of said first plurality of ball holders, said second channel being in fluidic communication with said first channel and also with said predetermined gap between the concave inner end and the ball.

8. The assembly of claim 1, further comprising a second plurality of solid lubricants which are normally pressed against said spiral groove.

9. The assembly of claim 8, wherein said outer sleeve is formed with a second plurality of radial holes for slidably holding therein said second plurality of solid lubricants, respectively.

10. The assembly of claim 9, wherein a stopper screw is threaded into a corresponding one of said second plurality of raidal holes and a spring is placed between said solid lubricant and said stopper screw so as to keep said solid lubricant urged inwardly.

11. The assembly of claim 10, wherein said first plurality of radial holes and said second plurality of radial holes are arranged alternately along a hypothetical spiral line having the same pitch as that of said spiral groove.

* * * * *